United States Patent [19]

Varela

[11] 4,410,382

[45] Oct. 18, 1983

[54] TELLTALE STRUCTURE AND METHOD OF PRODUCING SAME

[76] Inventor: Robert Varela, 9302 Cosgrove, Pico Rivera, Calif. 90660

[21] Appl. No.: 316,563

[22] Filed: Oct. 30, 1981

[51] Int. Cl.³ .................. B32B 3/00; B65B 11/00
[52] U.S. Cl. ......................... 156/70; 53/414;
73/147; 116/209; 156/176; 156/248; 156/250;
156/252; 156/269; 156/289; 156/290; 156/324;
206/616
[58] Field of Search ............... 156/70, 248, 250, 289,
156/290, 324, 256, 252, 269, 176; 73/147;
116/209; 206/616; 53/412, 414

[56] References Cited

U.S. PATENT DOCUMENTS 2,622,553 12/1952 Wilson ........................... 116/209
2,934,255 4/1960 McDuffie ....................... 206/616
4,294,008 10/1981 Pollack .......................... 156/250

FOREIGN PATENT DOCUMENTS 1344462 1/1974 United Kingdom ............ 156/70

Primary Examiner—Edward C. Kimlin
Assistant Examiner—Timothy W. Heitbrink

[57] ABSTRACT

A telltale structure which includes an elongate base tape with a pressure sensitive adhesive coating on the inner surface to engage the surface of an object to be studied.

Bonded to the outer surface of the base tape is an elongate overlay tape which contains a plurality of longitudinally spaced apertures.

Captured between the juxtaposed portion of the tapes are the inner end portions of thin, flexible streamers which have the free outer portions thereof within the confines of the apertures, whereby said outer portions can be acted upon by a fluid medium flowing over the surface of the object to be studied.

In producing the telltale structure, a continuous length of streamer material is laminated between the two tapes to provide streamer portions which are exposed in the apertures in the overlay tape, and one end of each exposed portion is then severed to provide the aforesaid free outer portions.

4 Claims, 8 Drawing Figures

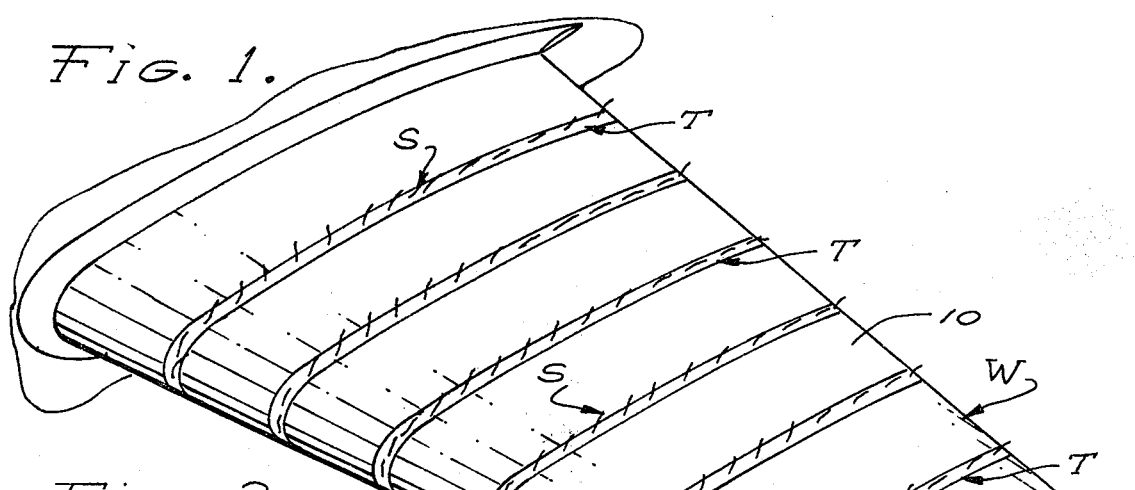
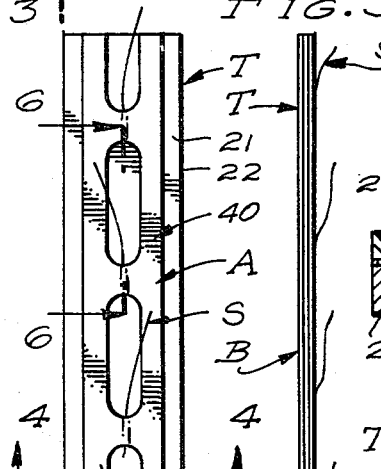
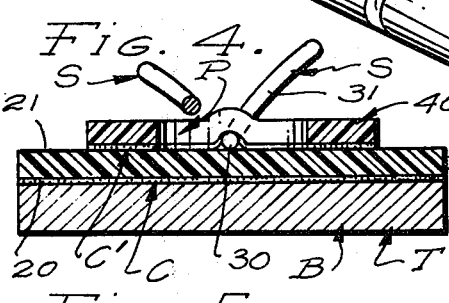
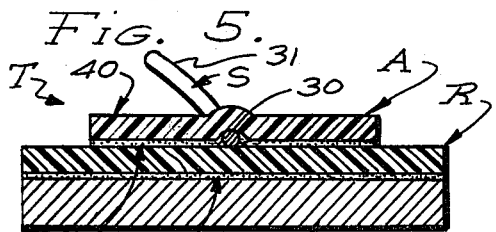
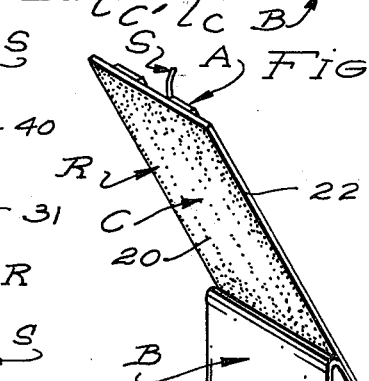
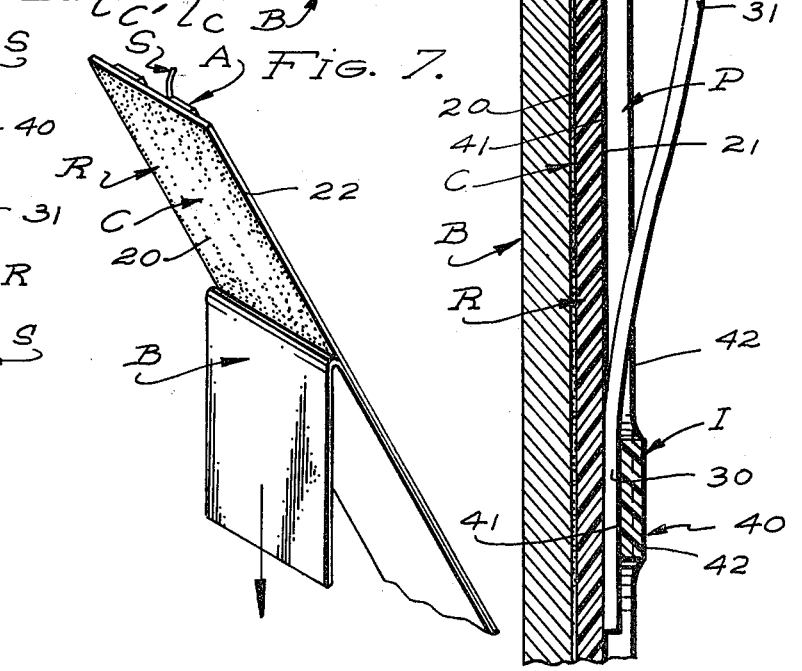

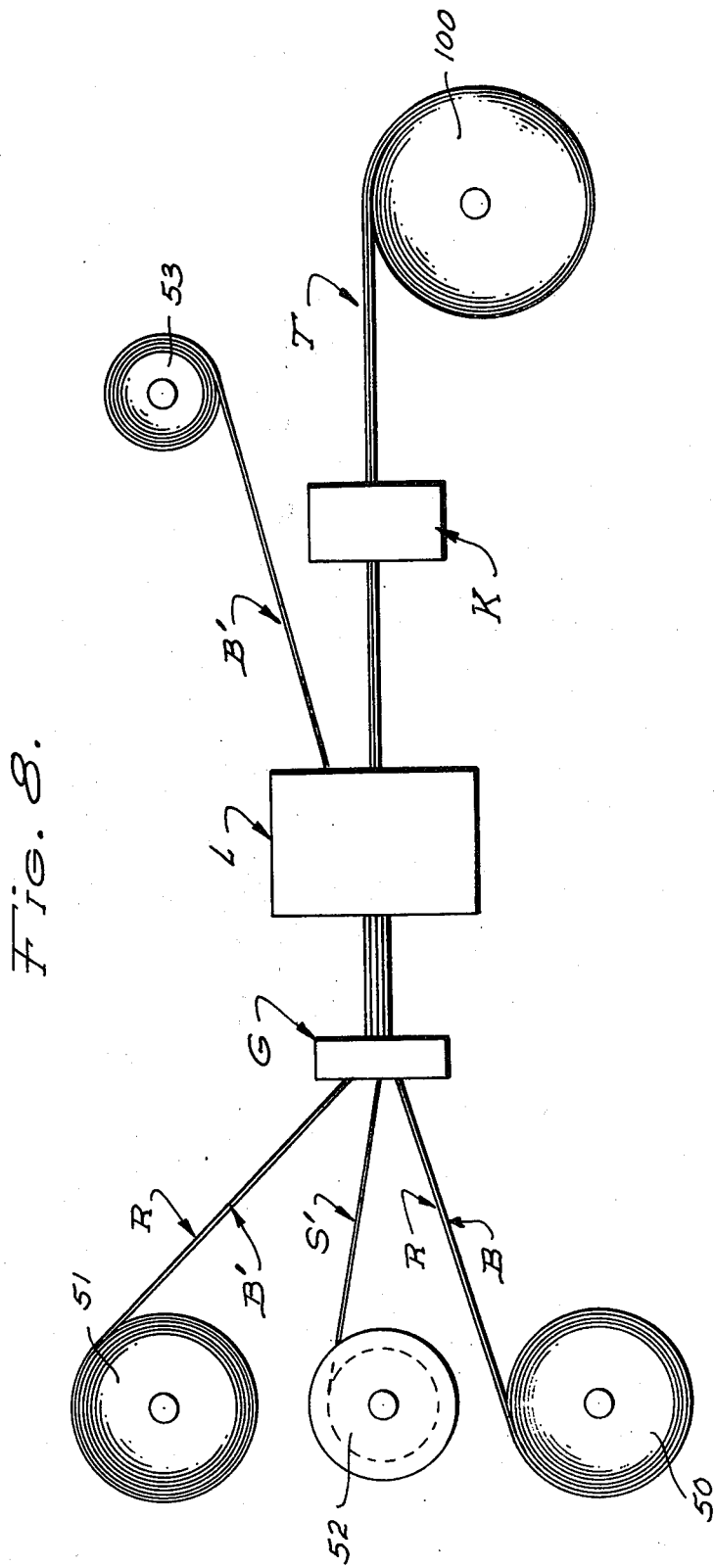

TELLTALE STRUCTURE AND METHOD OF PRODUCING SAME

BACKGROUND OF THE INVENTION

In the art of designing various objects or structures over which fluid media flow, it is often desirable to impart to such objects or structures a special shape or configuration which causes the fluid media to flow in such a manner as to attain a particular result.

One common and well-known end sought to be attained by specially shaping or forming objects over which fluid media flow, is to minimize the resistance and/or friction losses between the objects and the fluid media, whereby less energy is required to move the media relative to the objects or vice-versa. Such shaping or forming of objects is commonly referred to as "streamlining", and is widely practiced in the designing of aircraft, automobiles, and other objects and structures which move through the air when in use.

Another common and well-known end sought to be attained by special shaping and forming of solid structures, such as aircraft wings, is the attaining of airfoil shapes which establish most effective and efficient pressure differentials across the structures or wings, as they move in and relative to the air under predetermined operating conditions.

In the past, to determine how a fluid medium such as air flows about a solid object such as a wing, it has been common practice to fix a multiplicity of telltale streamers onto and throughout those portions of the wing surfaces which are to be evaluated or studied, and to thereafter effect desired movement of air over those surfaces, as by moving air over the wing in wind tunnel testing.

The same or analogous procedures are followed when testing and studying automobile bodies, the shapes of air ducts and most other structures and parts where an understanding of the dynamic relationship of the structures with a fluid medium is sought.

Prior to my invention, telltales have consisted of individual, elongate pieces of flexible material such as thread, string, ribbon and in some instance strips of paper, which have been manually arranged, one at a time, about the surfaces of the object or structure to be studied and which have had one end thereof secured to the related surfaces by means of glue or by pieces of pressure sensitive adhesive tape, whereby the pieces of material establish streamers at or adjacent to the surfaces.

The foregoing practice is extremely slow and tedious work and is such that unless great and special care and skill is practiced, the effectiveness of the study to be made cannot be assured.

Also, in carrying out the aforementioned procedure of affixing individual telltale streamers to surfaces of objects and structures, it is difficult to maintain all of the streamers of equal length; establish uniform spacing between related streamers; or assure that the streamers will not part or be pulled free from their related surfaces when worked upon by a fluid medium.

SUMMARY OF THE INVENTION

With the aforementioned limitations and deficiencies of known telltale streamers in mind, it is an object of my invention to provide a novel telltale structure which is easy and economical to manufacture; quick and easy to use; and highly effective and dependable in operation.

Another object and feature of my invention is to provide a telltale structure in the form of an elongate pressure adhesive tape, adapted to be applied to a surface of an object or structure to be studied and which carries a plurality of elongate streamers, of equal longitudinal extent and spaced at equal distances from each other, longitudinally of the tape.

A further object and feature of my invention is to provide a telltale structure of the character referred to above wherein said tape is provided with a manually releasable backing strip which normally covers the adhesive coating thereon, to thereby facilitate storing and handling or manipulating the structure prior to use, and to facilitate application of the telltale structure onto a related surface of an object or structure to be studied.

I have discovered that the above objects and advantages are achieved by providing a telltale structure which includes an elongate flexible base tape with a pressure adhesive coated inner surface to engage to related surface of an object or structure to be studied, and an elongate, flexible overlay tape bonded to the outer surface of the base tape and containing a plurality of longitudinally spaced aperatures, with a plurality of elongate flexible streamers arranged longitudinally of the tapes and each having an free outer end portion extending outward from the base tape and an inner end portion extending through a related opening in the overlay tape and thence between the two tapes where it is securely held in position.

DESCRIPTION OF THE DRAWINGS

In the drawings:

FIG. 1 is an isometric view of a wing structure with which my new telltale structure is related;

FIG. 2 is a top plan view of a portion of my telltale structure, showing the outer surface thereof;

FIG. 3 is a side elevational view of the telltale structure showin in FIG. 2;

FIGS. 4, 5 and 6 are enlarged sectional views (not to scale) taken substantially as indicated by lines 4—4, 5—5, and 6—6, respectively, on FIG. 2;

FIG. 7 is an isometric view showing the backing strip being removed from the telltale structure; and FIG. 8 is a diagrammatic view illustrating one typical apparatus and process for manufacturing my telltale structure.

DETAILED DESCRIPTION OF THE INVENTION

In FIG. 1 of the drawings, I have shown my new telltale structure T applied to the exterior surface 10 of a wing structure W, over and relative to which air moves. The telltale structure T includes a multiplicity of streamers S arranged in a predetermined pattern throughout the surface 10. The streamers S are shown disposed at those angles relative to the surface 10 which they might assume when worked upon by air flowing across the surface 10. By visually observing the streamers S, the aerodynamic characteristics of the wing structure W can be studied and desired information concerning those characteristics can be ascertained.

While I have elected to show the telltale structure T related to a wing structure, it will be apparent that it can be related to any other object or structure, the aerodynamics of which are to be studied. For example, it can be related to the exterior surfaces of automobile bodies or about the exterior or interior surfaces of various and different ducts, cowlings, and the like.

Referring to FIGS. 2 through 6 of the drawings, the telltale structure T includes an elongate, flat, ribbon-like flexible tape R with flat, inner and outer surfaces 20 and 21 and straight, parallel side edges 22. The inner surface 20 of the tape R is covered with a coating C of pressure adhesive cement to secure the tape to the surface 10 of the wing W (or other object). The structure T next includes a plurality of elongate, flexible streamers S spaced longitudinally of the outer surface 21 of the tape R, and anchoring means A anchoring or securing the inner end portions of the streamers on or with the tape R.

In practice, and as shown in the drawings, the inner surface 20 and adhesive coating C of the tape R are normally covered with or by a protective backing strip B of suitably treated flexible paper stock or the like to facilitate handling and manipulation of the structure T prior to applying it to the surface of an object, and which can be easily and conveniently stripped or pulled from engagement with the tape during or preparatory to applying the tape to a related surface, as is illustrated in FIG. 7 of the drawings.

In the preferred carrying out of the invention and as shown in the drawings, the streamers S are short lengths of lightweight, flexible string or thread and have mounted inner end portions 30 and free outer end portions 31.

The anchoring means A securing the inner portions 30 of the streamers S to the tape R preferably includes an enlongate, flexible ribbon-like anchoring strip 40 of flexible material having flat inner and outer surfaces 41 and 42. The strip 40 extends longitudinally of and is bonded to the outer surface 21 of the tape R with its inner surface 41 in flat opposing engagement with the outer surface 21 of the tape R. The strip 40 is engaged over the inner end portions 31 of the streamers S and holds said portions of the streamers in secure, captive engagement between the tape R and the strip 40.

The anchoring strip 40 can be wedded or bonded to the tape R in any desired and suitable manner. In the case illustrated, the strip 40 is bonded to the tape R by a suitable pressure adhesive cement C' applied to the surface 41 of said strip and adhering to the surface 21 of the tape R and to the inner end portions 30 of the streamers S.

In practice, and as shown in the drawings, the strip 40 is provided with a plurality of longitudinally spaced ports or apertures P, through which the outer end portions 30 of the streamers S freely extend. The apertures P are separated by intermediate imperforate portions I of the strip. The inner end portions 30 of the streamers S extend between the imperforate portions I of the strip 40 and the tape R, as illlustrated in FIG. 6 of the drawings.

In practice, and as shown in the drawings, the apertures P in the strip 40 are elongate, slot-like openings arranged centrally and extending longitudinally of the strip 40. The apertures P are slightly greater in longitudinal extent than the free outer end portions 31 of the streamers S.

The streamers S are established from a single length of thread or string arranged to extend longitudally of and between the strip 40 and tape R and which are severed or cut at one end portion of each aperture P, to establish the plurality of streamers S.

In practice, by varying the longitudinal extent and longitudinal spacing of the apertures P, the effective length and longitudinal spacing of the streamers S can be easily and conveniently adjusted and varied as desired or as circumstances require.

In practice, the anchoring strip 40 of the means A can be equal in lateral extent with the tape R or can be narrower than the tape R, as shown in the drawings, without departing or materially affecting the broader aspects and spirit of my invention.

With the telltale structure T constructed as shown in the drawings and as described above, it will be apparent that the structure T can be advantageously produced in great lengths in the form of rollers for storage or supply, and that sections of desired length can be easily cut and removed therefrom, as circumstances require.

It will be further apparent that when it is desired to apply sections of the structure T to the surface of an object, such as the surface 10 of the wing W shown in FIG. 1 of the drawings, it is only necessary for the workman to remove the backing strip B from the tape R and to press the tape R into engagement on and with the surface along some desired line.

With the telltale structure T that I provide, the length of all of the streamers S and the longitudinal spacing of said streamers are uniform. Thus, effective and uniform spacing of the streamers in related stream-lines is assured. By lateral spacing of two or more lengths of the telltale structure T, desired and effective uniform placement and distribution of streamers S throughout a surface area of an object or structure can be easily attained.

In practice, the tape R and strip 40 of the anchoring means A can be made of many different materials. For example, they can be made of paper of desired toughness and weight or they can be made of metal or of thin, strong and durable plastic films such as the plastic film produced by DuPont and sold under the trademark "Mylar". It will be noted that when materials such as Mylar film are used to establish my new telltale structure, the structure can be made extremely light and thin.

The form of the invention illustrated and described above is such that it can be easily and economically manufactured. In FIG. 8 of the drawings, I have diagrammatically illustrated a preferred apparatus and method which has proven to be effective in the manufacture of the telltale structure T.

The apparatus shown in FIG. 8 includes a lower supply spool or roll 50 of the tape R, which is provided with the backing strip B to cover and protect the coating of pressure adhesive C applied to a surface thereof. The apparatus also includes an upper supply spool or roll 51 of the perforated anchoring strip 40 with a backing strip B' (not previously described) related to it and covering a coating of pressure adhesive C' (not previously described) applied to one surface thereof. The apparatus further includes an intermediate supply spool 52 of continuous string or thread S'.

The tape R, strip 40 and thread S' are advanced from their related spools or rolls 50, 51 and 52 and are engaged in and through a guide G which aligns and arranges the tape and strip for lamination, with the thread S' therebetween. The aligned parts of the structure T are then advanced from the guide G into a laminator L. The laminator L operates to separate the backing strip B' from the strip 40 and presses the strip 40 into pressured bonded engagement on and with the tape R, with the thread S' therebetween. The backing strip B' which is separated from the strip 40 in and by the laminator L is advanced from the laminator L and can be collected on a take-up spool 53. At this time, the thread S' remains in a continuous form.

The laminated structure of tape, strip and thread then passes through a "kiss" cutter K, which cuts only threads S' adjacent one end of each aperture in the strip 40, thus completing manufacuture of the telltale structure T. The finished telltale structure is advanced from the cutter K and is rolled up to provide a supply roll 100 of the structure T. The roll 100 of the structure T is easy and convenient for storing, shipping and use.

It will be apparent, as shown in FIG. 8 of the drawings, that the apparatus and the method or process for making my new telltale structure T is uncomplicated, inexpensive and is highly effective and dependable in operation.

It is to be understood and is believed apparant that other apparatus and methods or means can be effectively used to make my new telltale structure T and that the apparatus shown in FIG. 8 of the drawings, and briefly described above, is intended to show one apparatus that has proven to be effective.

Having described only one typical preferred form and application of my invention, I do not wish to be limited to the specific details herein set forth but wish to reserve to myself any modifications and/or variations that might appear to those skilled in the art and which fall within the scope of the following claims

I claim:

1. The method of producing a telltale structure which is to be affixed to the surface of an object, which includes the steps of:

providing a length of base tape of thin, flexible material having flat outer and inner surfaces;

providing a length of overlay tape of thin, flexible material having an inner surface and containing a plurality of longitudinally-extending, spaced-apart apertures;

providing a length of thin, flexible streamers material;

bonding the inner surface of the overlay tape to the outer surface of the base tape in longitudinal alignment therewith and with the streamer material held captive therebetween, with the streamer material extending longitudinally of the tapes and having portions thereof exposed in said apertures; and severing one end of each exposed portion of the streamer material.

2. The method od producing a telltale structures as described in claim 1, in which:

the lengths of base tape, overlay tape and streamers material are in the form of roller;

the apertures in the overlay tape are of equal length and are spaced apart an equal distance;

the tapes are bonded together with the streamer material therebetween by passing them through a laminator; and after passing through the laminator, one end of each exposed portion of the streamer material is severed adjacent the same relative end of each aperture.

3. The method of producing a telltale structure as described in claim 2, in which:

the inner surface of the overlay tape contains an adhesive material; and the overlay tape is provided with a strip of backing material in contact with the adhesive material and which is removed therefrom prior to the laminating of the tapes and the streamer material.

4. The method of producing a telltale structure as described in claim 3, in which:

the backing material is fed onto a roller after being removed from the overlay tape; and the finished laminated telltale structure is wound on a roll for storage and shipping.

* * * * *